United States Patent [19]

Lin et al.

[11] Patent Number: 5,292,590
[45] Date of Patent: Mar. 8, 1994

[54] TIRE INNERLINER

[75] Inventors: Kuang F. Lin; Daniel W. Klosiewicz; Gregory I. Brodsky, all of Wilmington, Del.

[73] Assignee: Hercules Incorporated, Wilmington, Del.

[21] Appl. No.: 918,535

[22] Filed: Jul. 24, 1992

Related U.S. Application Data

[60] Continuation-in-part of Ser. No. 700,836, May 16, 1991, Pat. No. 5,156,921, which is a division of Ser. No. 492,698, Mar. 13, 1990, Pat. No. 5,040,583, which is a continuation-in-part of Ser. No. 180,925, Apr. 11, 1988, abandoned.

[51] Int. Cl.$^5$ .............................................. B32B 25/08
[52] U.S. Cl. ...................... 428/494; 428/35.4; 428/36.8; 428/519; 428/521; 428/522
[58] Field of Search ............. 428/35.4, 367, 36-38, 428/494, 519, 521, 522; 152/510, 511, 512; 156/90, 118

[56] References Cited

U.S. PATENT DOCUMENTS

| | | | |
|---|---|---|---|
| 2,061,522 | 11/1936 | Shively | 152/511 |
| 2,715,085 | 8/1955 | Boger | 428/36.7 |
| 3,565,151 | 2/1971 | Courtney | 152/347 |
| 4,254,169 | 3/1981 | Schroeder | 428/36.7 |
| 4,287,928 | 9/1981 | Hallman | 152/346 |
| 4,536,532 | 8/1985 | Miller | 524/141 |
| 4,561,920 | 12/1985 | Foster | 156/244.11 |
| 4,928,741 | 5/1990 | Rye et al. | 152/504 |

FOREIGN PATENT DOCUMENTS

| | | | |
|---|---|---|---|
| 12693 | 4/1976 | Australia . | |
| 31761 | 8/1972 | Japan | 152/510 |
| 222306 | 9/1986 | Japan . | |
| 8401127 | 9/1983 | PCT Int'l Appl. . | |
| 1358422 | 9/1971 | United Kingdom . | |

*Primary Examiner*—Edith Buffalow
*Attorney, Agent, or Firm*—Roy V. Jackson

[57] ABSTRACT

An innerliner for tubeless tires is comprised of at least one barrier layer such as poly(vinylidene chloride) or ethylene--vinyl alcohol copolymer film with each barrier layer sandwiched between two layers of an elastomeric material adhering to the rubber stock employed in the carcass of the tire. The innerliner has the advantage of imparting equal or better air retention properties to the tire with a substantial reduction in the thickness and weight relative to conventional halobutyl rubber innerliners.

13 Claims, No Drawings

TIRE INNERLINER

This application is a continuation-in-part of U.S. application Ser. No. 07/700,836, filed May 16, 1991, now U.S. Pat. No. 5,156,921, which is a division of application Ser. No. 07/492,698, filed Mar. 13, 1990, which issued as U.S. Pat. No. 5,040,583 on Aug. 20, 1991, which is a continuation-in-part of application Ser. No. 07/180,925, filed Apr. 11, 1988, now abandoned.

BACKGROUND OF THE INVENTION

This invention relates to tubeless pneumatic tires. More specifically, it relates to an innerliner (hereinafter innerliner, or liner, or liner ply) which is the inner-most layer of the tire structure for maintaining the internal air pressure in such a tire. Prior to the present invention, in a typical pneumatic tire manufacturing operation several plies of reinforced rubber were laid up during the tire building step and these became permanently laminated during the molding and curing step. The innermost one of these layers, the "innerliner", was composed of a rubber having lower air permeability than the rubber employed in other layers of the tire. This layer was usually based on butyl rubber or a halobutyl rubber, typically chlorobutyl.

In order to give a satisfactory performance in air pressure retention, the thickness of a halobutyl rubber based innerliner in a good quality auto tire must be on the order of about 60 mils. Such a liner has an air permeability of about 230 cc/m$^2$-atm-day at 65° C. For a 15 in. size passenger tire or light truck tire the liner weighs about 2.5 lbs., which is about 10% of the total weight of the tire.

When a vehicle is running, all of the components in the tires are flexing at a high frequency. A certain amount of energy is consumed as a "loss" due to hysteresis, which is indicated by the rise in the temperature of the material. A need exists in the tire industry for a reduction in the mass of any one or more components of the tire, without impairing the performance of the intended function of the component(s), that would reduce its share of the energy loss and result in an improvement of tire performance and fuel economy.

The rolling resistance of a tire can also be improved by increasing the air pressure in the tire. However, with the halobutyl rubber innerliner, the higher pressure can only be maintained by a thicker and heavier liner. The added weight of a thicker innerliner would offset the gain from the higher air pressure because it would increase the hysteresis loss. Therefore, the only meaningful way to achieve a higher tire pressure would be by improving the air-barrier property of the innerliner.

The present invention solves the above mentioned problems of the tire industry.

While butyl and halobutyl rubbers represent the best air barrier among elastomers, there are materials not normally considered to be elastomers which possess much better barrier properties. For example, thermoplastic polymers such as vinylidene chloride based polymers (PVDC), and ethylene-- vinyl alcohol copolymers (EVOH), have air permeabilities only a few percent or a fraction of a percent of that of the butyl rubbers. Although these barrier materials are well known and have been used in applications such as food packaging for their low air permeability, they have not been successfully used in tire construction.

SUMMARY OF THE INVENTION

The invention comprises a laminated structure comprising at least one layer of a thin film of non-elastomeric barrier material that (i) has an air permeability of no more than 0.05 Barrer at 23° C., (ii) is thermally stable to withstand the conditions required for the vulcanization of the rubber layer, and (iii) has adequate flexibility and extensibility to meet the requirement for fabrication process and functional needs, and a layer of an elastomer based material adhered to each surface of each barrier layer, the laminated structure being extensible beyond the elastic limit of the barrier layer without destroying its barrier ability.

The term "non-elastomeric" as used above is intended to exclude only the synthetic thermosetting high polymers having properties similar to natural rubber (as referred to in *Hawley's Condensed Chemical Dictionary, Eleventh Edition*, p. 453, as "originally defined by Fisher in 1940", and not to exclude any thin film material that meets the above three requirements.

The invention also comprises a process for making the laminated structure of claim 9, comprising laminating a layer of a thin film of non-elastomeric barrier material that has an air permeability of no more than 0.05 Barrer at 23° C. between and adhered to two layers of vulcanizable elastomer-based material containing vulcanizing agents, the thin film of non-elastomeric barrier material being thermally stable to withstand the conditions required for the vulcanization of the rubber layers and being extensible beyond its elastic limit along with the layers of the elastomer-based material without destroying its barrier ability, and subjecting the laminated structure to the said conditions required for the vulcanization of the rubber layers.

DETAILED DESCRIPTION OF THE INVENTION

It was discovered that laminated structures comprised of a thin layer or layers of a barrier material sandwiched between and bound to layers of an elastomeric material can serve as excellent innerliners for tubeless pneumatic tires or other applications where a thin rubbery material with high air/gas barrier property is required. The requirements of this laminated structure are that the barrier material layer provides excellent resistance to permeation by air and other gases and be well bonded to the elastomeric layers and that the elastomeric layer in the structure be adhering to other rubbers used in the carcass of the tire.

The inclusion of the innerliner layer or layers according to this invention in a tire effects a significant improvement in the air retention characteristics as compared to a similar tire having a conventional innerliner. The air permeation resistance of the barrier layer in the innerliner of the instant invention is orders of magnitude better than conventional rubber innerliner stocks. Thus, a 1 mil layer of a barrier material in the liner of this invention can be equivalent to a 10 mil or thicker layer of butyl rubber.

The thin film of the barrier material of the innerliner layer can be selected from a wide variety of materials as long as the material has the following characteristics:

(i) The air permeability (P) of the barrier material can be no greater than 0.05 Barrer at 23° C. (one Barrer is equal to $1.0 \times 10^{-10}$ cc-cm/cm$^2$-cmHg-sec or 166 cc-mil/100 in$^2$-atm-day). By Comparison, the air permeability of butyl or halobutyl rubber, the premium standard material of current commercial tire innerliners, is about 0.5 Barrer.

(ii) The barrier material must be thermally stable to withstand the conditions required for the vulcanization (crosslinking) of the rubber.

(iii) The barrier material must have adequate flexibility and extensibility to meet the requirements of the fabrication process and functional needs of the object, such as tires, of which it is to become a part.

As long as the thin film material of the barrier layer meets the above three requirements, additives, such as plasticizers, modifying resins, processing aids, etc. can be included therein. A processing aid such as a glycol or polyhydroxyl compound of 2–10% based on the weight of the barrier material is especially useful when the barrier material is an extrusion grade ethylene-vinyl alcohol copolymer.

Examples of thin film barrier materials that meet the above mentioned requirements are as follows:

TABLE I

| MATERIALS | GAS PERMEABILITY, IN BARRIERS, AT 23° C. | | | | |
|---|---|---|---|---|---|
| | $O_2$ | $N_2$ | $CO_2$ | He | Air(Calc.) |
| EVAL ® EP-F EVOH (a) | $6.02 \times 10^{-5}$ | $6.02 \times 10^{-6}$ | $1.93 \times 10^{-4}$ | 0.06 | $1.81 \times 10^{-5}$ |
| EVAL ® EP-H EVOH (a) | $1.81 \times 10^{-4}$ | $2.41 \times 10^{-5}$ | $4.04 \times 10^{-3}$ | 0.1 | $5.42 \times 10^{-5}$ |
| EVAL ® EP-E | $5.48 \times 10^{-4}$ | $4.82 \times 10^{-5}$ | $1.29 \times 10^{-3}$ | 0.14 | $1.41 \times 10^{-4}$ |
| Saran ® 5253 PVDC (a) | $9.04 \times 10^{-4}$ | $7.23 \times 10^{-5}$ | $1.99 \times 10^{-3}$ | 0.16 | $2.41 \times 10^{-5}$ |
| Saran ® 468 PVDC (a) | $3.01 \times 10^{-3}$ | | | | |
| Barex ® 210 Nitrile (a,b) | $4.82 \times 10^{-3}$ | | $6.63 \times 10^{-3}$ | | |
| Nylon 6 (a) | $1.57 \times 10^{-2}$ | $5.42 \times 10^{-3}$ | $2.83 \times 10^{-2}$ | | $7.47 \times 10^{-3}$ |
| Amorphous nylon (c) | $1.20 \times 10^{-2}$ | | | | |
| PET polyester (b) | $3.01 \times 10^{-2}$ | | | | |
| For comparison: | | | | | |
| Natural rubber (d) | 23.2 | 8.05 | 131.1 | 31.2 | 11.1 |
| Butyl rubber (d) | 1.30 | 0.33 | 5.16 | 8.42 | 0.52 |
| Polyepichlorohydrin (d) | 0.31 | 0.047 | 3.41 | 1.74 | 0.1 |
| Oriented PP (b) | 0.98 | | | | |

(a) Data from Technical Bulletin No. 110, "Gas Barrier Properties of Eval Resins," p. 2, Table 1, Kuraray Co., Tokyo.
(b) Data from "Packaging Encyclopedia & Yearbook 1985," pp. 64F–65, Cahners Publishing Co., Denver, CO.
(c) Data from Technical Bulletin E-73974, "Selar PA 3426 Barrier Resin," DuPont Company, Wilmington, DE.
(d) Data from "Rubber Handbook," p. 284, Table 6, R. T. Vanderbilt Co., Norwalk, CT.

Vinylidene chloride based polymers applicable in this invention as the barrier material of the innerliner can be a copolymer of vinylidene chloride (VDC) with one or more comonomers including, but not limited to, vinyl chloride, acrylonitrile, acrylates, methacrylates, and acrylic acids. Some of these materials are sold under the trademark "Saran" by Dow Chemical Company, Midland, Mich. The best barrier properties are achieved with higher concentrations of VDC, while better flexibility is usually associated with a lower VDC content in the polymer. Preferred are polymers having 60 to 95% VDC.

Ethylene--vinyl alcohol copolymers useful as the barrier material of the innerliner are saponification products of ethylene--vinyl acetate copolymers. Here again, better barrier properties are achieved with higher vinyl alcohol content, i.e., lower ethylene content and higher degree of saponification of the vinyl acetate moieties in the copolymer. Some of these materials are sold under the trademark "EVAL" by Kuraray Co., Ltd., Osaka, Japan. Preferred are polymers which contain less than 50 mole % ethylene and which are more than 90% saponified.

Both the ethylene--vinyl alcohol copolymer and the vinylidene chloride based polymers are thermoplastic, film-forming polymers. Both are amenable to extrusion at reasonably low working temperatures. Accordingly, the innerliner structure comprised of the barrier material layer sandwiched between two surface layers of rubber can readily be prepared by the known coextrusion technique where all three layers are extruded simultaneously through a single die having three extrusion orifices.

To ensure that good bonding is achieved between the barrier layer and the surface layers of the laminate, an adhesive or tie layer can be applied. A copolymer of ethylene and ethyl acrylate or other acrylate or methacrylate monomer (EEA resin) serves well as the tie layer for the PVDC barrier layer and the rubber surface layer. It is preferred that the tie layer be a blend of EEA resin and styrene-isoprene or styrene-butadiene thermoplastic elastomers or the hydrogenated products thereof. The blending ratio can be in the range of about 10 to 90% of EEA, preferably between about 25 and 75% of EEA. The preferred EEA resin contains about 70% ethylene.

The effective tie layer material between the EVOH barrier layer and the rubber surface layer is a blend of maleic anhydride grafted polypropylene and styrene-isoprene or styrene-butadiene thermoplastic elastomer or the hydrogenated products thereof. The blending ratio can be in the range of about 5 to 95%, preferably from 10 to 50%, of the grafted polypropylene. The maleic anhydride content of the grafted polypropylene is from about 0.05 to 5%, preferably 0.1 to 4%.

It is preferable to develop a strong and adequate adhesion directly between the rubber skin layers and the thin film barrier material layer without tie layer involvement. It has been discovered that this can be achieved by incorporating selected types and amounts of phenolic resins in the skin compound. The applicable phenolic resins include both the heat-reactive types that are occasionally used as curing resins for butyl rubber and other elastomers, e.g., SP-1044 and SP-1045 resins from Schenectady Chemicals Co., Schenectady, N.Y., and the non-reactive type phenolic tackifying resins, e.g., SP-1077, also from Schenectady Chemicals Co.

It was further discovered that by excluding sulfur-related curatives, especially chemicals that would release amines or other bases at rubber curing temperatures such as sulfenamide type accelerators, the adhesion developed directly between the rubber skin layers and the thin film barrier material layer by virtue of the phenolic resins was further improved.

The materials used for the surface (outer) layers of the innerliner can be any elastomer including thermoplastic elastomers with appropriate compounding. It is permissible, and may even be desirable in some cases, that different rubber layers be applied to different sides of the barrier layer. The choice is a matter of economics, availability, relative suitability for the particular process chosen to fabricate the composite sheet structure, and other considerations that are well known in this art. Preferably, the composition of the rubber layers is chosen such that it will give strong adhesion to the barrier layer as well as the carcass ply.

The surface layer of the innerliner of this invention can be any rubber which gives strong adhesion to both the carcass ply of the tire, which is usually the layer next to the innerliner in tire construction, and the barrier material. It is sometimes more advantageous to use a thermoplastic elastomer (TPE) in lieu of a conventional rubber as the base polymer for the surface layer, since the TPE's are more amenable to extrusion into thin films than are conventional elastomers. Any TPE can be used to make the surface layer. The choice is made based primarily on its adhesion to carcass and to the barrier layer, cost, and processibility. Styrene block copolymer TPE's such as those sold under the trademark of "Kraton" by Shell Chemical Company, polyolefin TPE's such as "Santoprene" by Monsanto Company, and polyester TPE's such as "Hytrel" by DuPont are examples of TPE's which work well.

Normally, the thermoplastic nature of TPE's is retained in their applications. It is desirable and usually necessary to incorporate an appropriate vulcanizing agent in the TPE surface layer to (1) allow the innerliner to be more adaptable in the existing tire making process, and (2) improve adhesion and the chance of co-curing with the carcass ply. To improve the physical properties of the surface layer, the elastomer may be further compounded with reinforcing fillers such as carbon black, tackifying agents, plasticizers, and other modifiers well known to those skilled in the art.

It is a critical requirement of the instant invention that the adhesion between adjacent layers in the multi-layer composite sheet structure be adequate to resist delamination when the structure is tensile stretched to reach 100 percent elongation in any direction. In many barrier/rubber pairs, the adhesion is developed with the appropriate compounding of the rubber and/or barrier layer, and/or a proper surface treatment of either or both of the layers. It is possible, but less desirable, to achieve the required adhesion by applying an adhesive between the layers.

Incorporation of the thin film barrier material into a sandwich with the rubber surface layers to form the innerliner serves several purposes. The first such purpose is to create an innerliner of somewhat increased bulk as compared to using simply a layer of the thin film barrier material, which is usually so thin that handling of it without creating wrinkles or other defects can sometimes be difficult. This type of problem is less likely with the thicker rubber--barrier layer laminate.

A second purpose served by incorporating the thin film barrier material into a sandwich or laminate structure with rubber surface layers is to protect and preserve the thin film barrier material layer. Since the preferred barrier materials are thermoplastic materials, they tend to melt and flow at tire curing temperatures. Sandwiching the barrier material between rubber layers will preserve the barrier material layer structure by restraining the barrier material from flowing, thus allowing it to resolidify in place after the temperature is dropped below its melting or softening point.

Furthermore, in the case of a PVDC barrier layer, the rubber surface layers tend to insulate the PVDC from the most serious heating effects, thus minimizing the thermal degradation of the PVDC polymer. In the case of an EVOH barrier layer, the rubber skins will provide a barrier for moisture to which the EVOH polymers are sensitive.

The third, and most important, reason for sandwiching the barrier layer between rubber layers has to do with the difference in elasticity and extensibility between the rubber and the barrier polymer. Rubber, as is well known, is a highly elastic material, and can be elongated to several hundred percent without exceeding its elastic limit. This quality is the principal reason that rubber is used in tires and allows a tire to withstand the extremely rough handling that it receives in everyday usage. The barrier materials, by contrast, have relatively low elastic and elongation limits. During the shaping step in the manufacturing process, parts of the tire structure, including the innerliner, have to sustain elongation of 100% or more. When the film is bound between the rubber layers, it is found that the barrier layer can be stretched beyond its normal elongation limit along with the rubber and upon the rubber returning to its original dimension, the barrier material is forced into a folded, sinusoidal configuration with the interior surface of the rubber layers following the folds in the barrier material and maintaining the integrity of the innerliner structure. The thin film barrier material is also protected from abrasion and breakage by being enclosed between the rubber layers.

The improved properties of tires prepared using the innerliner of this invention are demonstrated by the following examples. Parts and percentages are by weight unless otherwise specified.

EXAMPLE 1

An improved innerliner in accordance with this invention was fabricated by coextruding a 5-layer sheet of ABCBA structure.

Layer A is the surface layer which had the following ingredients:

| | |
|---|---|
| Block copolymer TPE[1] | 100.0 parts |
| Stearic acid | 1.0 parts |
| Hydroquinoline antioxidant[2] | 1.0 parts |
| Zinc oxide | 1.5 parts |
| Carbon black N550 | 20.0 parts |
| Hydrocarbon Resin[3] | 20.0 parts |
| Vulcanization accelerator[4] | 0.3 parts |
| Vulcanizing agent[5] | 2.0 parts |
| Sulfur | 0.3 parts |

[1]Kraton 1117 by Shell Chemical Co.
[2]Agerite Resin D by R. T. Vanderbilt Co.
[3]Piccopale 100 by Hercules.
[4]Santocure by Monsanto Company.
[5]Sulfasan R by Monsanto Company.

The mixture was prepared in a manner standard to the rubber industry, using a Banbury mixer, a 2-roll mill, and other auxiliary equipment.

Layer B, the tie layer, had the following ingredients:

| | |
|---|---|
| Hydrogenated styrenic block TPE | 60.0 parts |
| EEA Resin (DPD-6169 from Union Carbide) | 40.0 parts |

Pellets of both these components were thoroughly blended in a V-blender.

Component C is an extrusion grade PVDC resin (Saran from Dow Chemical Co.).

These three components were fed from separate extruders into a 5-layer feed block where A and B were each split into two streams. Thereafter, the layers converged but still maintained their identity, and were extruded into a 5-layer composite sheet (A,B,C,B,A) through a common die set at the desired die-gap clearance, and was quenched on a chill roll. The thickness of the layers was controlled by adjusting the throughput rate of the individual extruders feeding into the feed block. The resultant layer thicknesses were 7, 1, 2, 1, and 7 mils respectively for A, B, C, B, and A.

The sheet was found to have excellent air barrier properties. Its air permeance is 155 $cc/m^2$-atm-day, which is significantly lower than the 194 $cc/m^2$-atm-day air permeance of a typical commercial chlorobutyl rubber based innerliner at 60 mils thick. The sheet was rubbery and stretchable. It was found that after being stretched to 200% elongation, and released, the sheet specimen substantially recovered its original dimensions. More importantly, the air permeability of the sheet had not changed. Upon examining the cross-section of the specimen under a scanning electron microscope, it was found that the barrier layer had been forced into a folded, sinusoidal, or a "micro-corrugated" configuration with the interior surface of the rubber skins following the contour of the barrier layer and maintaining the integrity of the laminate structure.

The sheet was used as a direct replacement of the conventional innerliner of a tubeless 15-inch light truck tire in a standard tire making operation. It exhibited excellent tack to the carcass ply, and there was no difficulty through the entire tire-making process. The resultant tire (tire A) satisfactorily passed the standard air pressure retention test by retaining more than 98% of the 45 psig pressure in a constant (23° C.) temperature room for 2 weeks. A commercial tire (tire C) made with the standard liner was used as the control. It also showed a 98% pressure retention over the same 2-week period. The innerliner sheet of this invention for the 15 inch light truck tire (tire A) weighed 0.95 pounds while the standard halobutyl interliner of the conventional 15 inch commercial tire (tire C) weighed 2.97 pounds.

Separately, the sheet was modified to give a micro-corrugated barrier layer by mechanically stretching it to 200% elongation and then relaxing, and was used to make tires (tire B) as above. The tires were found to retain 99% of the 45 psig air pressure over the 2-week period.

EXAMPLE 2

The liner in accordance to this invention of a three layer laminated sheet of A-C-A structure was prepared.

Component A is the surface layer which had the following ingredients:

| | |
|---|---|
| Block copolymer TPE[1] | 100.0 parts |
| Stearic acid | 1.5 parts |
| Age Rite Resin D | 1.0 parts |
| Zinc oxide | 1.5 parts |
| Carbon black | 25.0 parts |
| Piccopale 100 resin | 15.0 parts |
| Phenolic resin, heat-reactive[2] | 5.0 parts |
| Phenolic resin, non-heat-reactive[3] | 3.0 parts |
| Santocure | 0.3 parts |
| Sulfasan R | 4.0 parts |
| Sulfur | 0.3 parts |

[1]Kraton 1117.
[2]Schenectady SP-1045 by Schenectady Chemicals Company.
[3]Schenectady SP-1077 by Schenectady Chemicals Company.

The mixture was compounded in a manner standard to the rubber industry, using a Banbury mixer, a 2-roll mill, and other auxiliary equipment.

Component C, the barrier layer, is an extrusion grade ethylene–vinyl alcohol (EVOH) copolymer resin (EVAL-G from the Kuraray Co., Ltd.), further modified with 4% of ethylene glycol based on the weight of the EVOH resin to improve processibility.

These two components were coextruded from separate extruders through a 3-layer feed block. Component A was split into two streams to form the surface layers sandwiching the barrier layer C. Thereafter, the layers converged but maintained their identity, and were extruded through a common die set at the desired die gap clearance into a 3-layer composite sheet. The thickness of the layers was controlled by adjusting the throughput rate of the individual extruders. The resultant layer thickness was 9, 1, and 9 mils respectively for A, C, and A.

The sheet was found to have excellent air barrier properties. Its air permeance is 49.6 $cc/m^2$-atm-day at 65.5° C. which is much lower than that of a typical premium grade commercial innerliner of 55 mil halobutyl rubber at 210.8 $cc/m^2$-atm-day. A sample of the sheet was stretched to 150% elongation, which far exceeds the elongation to be endured by the innerliner in tire-making process or during the use of tires. After the stress was released, the sheet substantially recovered its original overall dimensions. The air permeance was found to be 57.4 $cc/m^2$-atm-day at 65.5° C., thus ensuring that excellent air barrier properties will be achieved with this material as tire innerliner.

EXAMPLE 3

An innerliner similar to that in Example 2 of a three layer laminated sheet of A-C-A structure was prepared.

Component A is the surface layer and had the following ingredients:

| | |
|---|---|
| Block copolymer TPE (1) | 100.0 parts |
| Stearic acid | 1.5 parts |
| Age Rite Resin D | 1.0 parts |
| Zinc oxide | 1.5 parts |
| Carbon black | 35.0 parts |
| Piccopale 100 resin | 15.0 parts |
| Phenolic resin, heat-reactive (2) | 5.0 parts |
| Phenolic resin, non-heat-reactive (3) | 3.0 parts |
| Santocure | 0.3 parts |
| Sulfasan R | 3.0 parts |
| Sulfur | 0.3 parts |

(1) Kraton 1117.
(2) Schenectady SP-1045.
(3) Schenectady SP-1077.

The mixture was compounded in the standard manner as described before.

Component C, the barrier layer, was a 0.8 mil thick extruded film of an ethylene-vinyl alcohol (EVOH) copolymer resin (EVAL-E from the Kuraray Co.).

Component A was calendered on a 3-roll calender to about 12 mils in thickness and laminated to both sides of component C to give the A-C-A three layer laminated sheet. The over-all thickness was about 25 mils.

The air permeance of the 25-mil sheet Was 51.3 cc/m$^2$-atm-day at 150° F. (65.5° C.), which is only one-fourth of that of a 55-mil premium grade halobutyl rubber inner liner at 210.8 cc/m$^2$-atm-day under the same testing conditions. The halobutyl innerliner for a 13 inch tubeless tire weighed 2.02 pounds while the same size innerliner of the instant invention weighed only 0.73 pounds representing a 63.8% weight reduction.

The sheet was successfully used as a direct replacement of the conventional innerliner of a 13-inch tubeless passenger tire. The resultant tire passed the standard air pressure retention test by retaining 99% of the 45 psi. initial pressure over the two-week test period.

While multi-layer coextrusion and calendering were used to fabricate the innerliner in the above examples, they are not the only methods applicable. Extrusion coating, lamination and other techniques effective in making multi-layer sheet structures can also be used.

EXAMPLE 4

A rubbery composite sheet with A-C-A type laminated structure and high gas barrier property in accordance with this invention was prepared.

Component A is the surface layer which contained the following ingredients:

| | |
|---|---|
| Natural rubber | 65 parts |
| Block copolymer TPE[1] | 35 parts |
| AgeRite Resin D | 1 part |
| Zinc oxide | 3 parts |
| Carbon black | 50 parts |
| Phenolic resin[2], heat reactive | 12 parts |
| Stearic acid | 1 part |

[1]Kraton 1102, Shell Chemical Co.
[2]Resin SP-1045, Schenectady Chemicals Co.

The ingredients were compounded in a manner standard to the rubber industry, using a Banbury mixer, a 2-roll mill, and other auxiliary equipment.

Component C, the barrier layer, is a 1-mil thick nylon 6 film (Capran nylon film from Allied Engineered Plastics, Pottsville, Pa.)

Component A was calendered to about 12 mils in thickness, and laminated to both sides of component C to give the A-C-A structure. The total thickness of the composite sheet was about 25 mils.

The composite sheet was cured in the press at 360° F. for 12 minutes. The sheet was measured to have an air permeability of 180 cc/m$^2$-atm-day at 150° F. and a basis weight of 730 g/m$^2$. These compare favorably to a commercially used halobutyl rubber tire innerliner of 55 mils thickness with air permeability at 210 cc/m$^2$-atm-day and a basis weight of 1690 g/m$^2$.

The composite sheet shows no sign of delamination and retains its superior barrier property after it was stretched to 100% elongation. When the sheet was laminated to a sheet of a green tire carcass ply, cured at 360° F. for 12 minutes, and then tested for their adhesion. The T-peel specimens failed by rubber tear when the force reached 45 lb/in and the bonding at the interface remained intact. Thus, for applications such as tire innerliner or the fabrication of other pneumatic articles, the composite sheet can give about twice as good air retention and, simultaneously, a precious weight saving of about 57% in comparison to the commercial halobutyl rubber material.

EXAMPLE 5

An A-C-A composite structure similar to that of Example 4 was prepared.

Component A was identical to that in Example 4.

Component C, the barrier layer, was the same nylon 6 film as in Example 4, except that the film had been exposed to 24 megarad of electron beam irradiation. Before irradiation, the film was completely soluble in m-cresol; after the irradiation, part of the film became insoluble in m-cresol, indicating that a degree of cross-linking of the nylon polymer had been reached and that the film was no longer thermoplastic.

The composite sheet was prepared in the same manner as in Example 4. The air permeability of the 25-mil thick composite sheet, at 150° F., was found to be 93 cc/m$^2$-atm-day. After the sheet was stretched to 100% elongation and relaxed, the composite sheet did not delaminate and its air permeability was found to be 126 cc/m$^2$-atm-day. T-peel test of the adhesion between the irradiated nylon 6 film and the rubber surface layer showed that the adhesion was stronger than the cohesive strength of the rubber layer. Thus, the composite sheet will give improved air retention and weight reduction as a tire innerliner than conventional halobutyl rubber based materials.

EXAMPLE 6

An A-C-A composite structure similar to that of Example 3 was prepared.

Component A has the following composition:

| | |
|---|---|
| Natural Rubber | 60.0 parts |
| Styrene-butadiene rubber (SBR)[1] | 40.0 parts |
| Stearic acid | 1.0 part |
| Zinc oxide | 3.0 parts |
| Carbon black | 50.0 parts |
| AgeRite Resin D | 1.0 part |
| Phenolic resin, heat-reactive, SP-1045 | 5.0 parts |
| Phenolic resin, non-reactive, SP-1077 | 3.0 parts |
| Diurethane vulcanizing Agent[2] | 0.5 parts |

[1]Synpol ® 1500 from Texas-U.S. Chemical Co., Port Neches, TX.
[2]Novor ® from Akron Chemicals, Akron, OH.

Component C was the same EVOH film as in Example 3.

The A-C-A composite sheet at a total thickness of 31 mils was prepared by calendering compound A into 15-mil thick sheets as the surface layers, and laminated with Component C to give a 3-layer composite sheet. It was found that after being cured at 360° F. for 12 minutes, the adhesion at the rubber/EVOH interface of the laminate was greater than the cohesive strength of the rubber layer, since the rubber tab of the test specimen failed cohesively at 44 lbs/in, and the rubber/EVOH bonding remained intact. The air permeability of the 31-mil composite sheet was 53 cc/m$^2$-atm-day at 150° F. After being stretched to 100% elongation and relaxed, the composite showed no delamination and the air permeability remained unchanged. As a tire innerliner, the composite sheet would give significant advantages in air retention and weight saving than the conventional halobutyl rubber based innerliner described previously.

EXAMPLE 7

The A-C-A type composite structure similar to that of Example 6 were prepared. One with rubber skin component A-1 containing the sulfur curatives, and the other with rubber skin component A-2 without the sulfur curatives. Both composites used the same EVOH film as in Example 6 to be component C. The preparation and the subsequent curign of the composite structures were carried out in the same manner as in Example 6.

| Rubber Skin Composition | A-1 | A-2 |
|---|---|---|
| Natural rubber | 60 | 60 |
| SBR - 1500 | 40 | 40 |
| Stearic acid | 1 | 1 |
| Zinc oxide | 3 | 3 |
| Carbon black | 50 | 50 |
| AgeRite Resin D | 1 | 1 |
| Phenolic resin, SP-1045 | 5 | 5 |
| Phenolic resin, SP-1077 | 3 | 3 |
| Sulfur | 0 | 0.8 |
| Santocure | 0 | 0.8 |
| Diurethane agent[1] | 1 | 1 |
| Rubber/EVOH cured adhesion, pli | 38.7 | 6.4 |

[1]Novor ® from Akron Chemicals, Akron, OH.

The composite structure prepared with the A-1 rubber skins showed significantly improved adhesion to the barrier film layer than the one with A-2 rubber skins.

EXAMPLE 8

An A-C-A composite structure similar to that of Example 3 was prepared. Component A has the following composition:

| Natural Rubber | 65 parts |
|---|---|
| Block copolymer TPE | 35 parts |
| Stearic acid | 1 part |
| Zinc oxide | 3 parts |
| Carbon black N330 | 50 parts |
| AgeRite Resin D | 1 part |
| Phenolic resin SP-1045 | 10 parts |
| Novor 924 | 0.025 parts |
| Organic peroxide[1] | 2.5 parts |

[1]Dicup 40 KE from Hercules Incorporated.

Component C was the same EVOH film as in Example 3. The A-C-A composite sheet at a total thickness 27 mils was prepared by calendering compound A into 13 mils thick sheets as the surface layers and laminated with component C to give a 3 layer composite sheet. The sheet was used as a direct replacement of the conventional innerliner of a tubeless 15-inch passenger tire. The resultant tire passed the standard air pressure retention tests. Moreover, the tire retains 88% of the 45 psi initial pressure after 42 months of test period. The control tire of the same size but with a commercial innerliner lost 42% of the initial air pressure after only 2.5 months. The tires with composite innerliner passed all the D.O.T. (Department of Transportation) mandatory dynamometer tests.

What we claimed is:

1. A laminated structure comprising at least one layer of a thin film non-elastomeric barrier material that (i) has an air permeability of no more than 0.05 Barrer at 23° C., (ii) is thermally stable to withstand the conditions required for the vulcanization of the rubber layer, and (iii) has adequate flexibility and extensibility to meet the requirement for fabrication process and functional needs, and a layer of an elastomer based material adhered to each surface of each barrier layer, the laminated structure being extensible beyond the elastic limit of the barrier layer without destroying its barrier ability.

2. The laminated structure of claim 1 wherein the thin film barrier layer is a vinylidene chloride based polymer.

3. The laminated structure of claim 1 wherein the surface layers are styrene-isoprene-styrene block copolymer.

4. The laminated structure of claim 1 wherein the surface layers are styrene-butadiene-styrene block copolymer.

5. The laminated structure of claim 1 wherein the thin film barrier layer is a ethylene--vinyl alcohol copolymer.

6. The laminated structure of claim 1 wherein the surface layers are styrene-isoprene-styrene block copolymer.

7. The laminated structure of claim 1 wherein a phenolic resin additive is are incorporated into the elastomer layers.

8. The laminated structure of claim 7 wherein the phenolic resin containing elastomer layer does not contain sulfur and sulfenamide type accelerators as its vulcanizing agents.

9. The laminated structure of claim 1 wherein the ethylene-vinyl alcohol copolymer is an extrusion grade copolymer that is modified with 2–10%, based on the weight of the copolymer, of a processing aid selected from a glycol or polyhydroxyl compound.

10. The laminated structure of claim 9 wherein the processing aid is ethylene glycol or glycerine.

11. A process for making the laminated structure of claim 1 comprising laminating a layer of a thin film barrier material that has an air permeability of no more than 0.05 Barrer at 23° C. between and adhered to two layers of a vulcanizable elastomer-based material containing vulcanizing agents, the thin film barrier material begin thermally stable to withstand the conditions required for the vulcanization of the rubber layers and being extensible beyond its elastic limit along with the layers of the elastomer-based material without destroying its barrier ability, and subjecting the laminated structure to the said conditions required for the vulcanization of the rubber layers.

12. A process for making a laminated structure as claimed in claim 11, wherein a phenolic resin additive is incorporated into the elastomer layers.

13. The laminated structure of claim 12 wherein the vulcanizing agents int he elastomer layers are free of sulfur and sulfenamide type accelerators.

* * * * *

UNITED STATES PATENT AND TRADEMARK OFFICE
CERTIFICATE OF CORRECTION

PATENT NO. : 5,292,590

DATED : March 8, 1994

INVENTOR(S) : Kuang F. Lin; Daniel W. Klosiewicz; and Gregory I. Brodsky (Case 1-2-3-4).

It is certified that error appears in the above-identified patent and that said Letters Patent is hereby corrected as shown below:

Col. 11, line 9, "curign" should be --curing--;

Col. 11, line 24, in the Table, there is a long line above "Rubber/EVOH.......6.4" that is missing in the Official Patent;

In the claims, Col. 12, line 48, "begin" should be --being--; and

In the claims, Col. 12, line 59, "agents int he" should be --agents in the--.

Signed and Sealed this

Sixteenth Day of August, 1994

Attest:

BRUCE LEHMAN

Attesting Officer

Commissioner of Patents and Trademarks